United States Patent
Waldheuer et al.

(10) Patent No.: US 11,542,007 B2
(45) Date of Patent: Jan. 3, 2023

(54) DUAL CONFIGURATION LAVATORY WITH ASSIST SPACE

(71) Applicant: Airbus Operations GmbH, Hamburg (DE)

(72) Inventors: René Waldheuer, Hamburg (DE); Andreas Heidtmann, Fredenbeck (DE)

(73) Assignee: Airbus Operations GmbH

( * ) Notice: Subject to any disclaimer, the term of this patent is extended or adjusted under 35 U.S.C. 154(b) by 717 days.

(21) Appl. No.: 16/216,245

(22) Filed: Dec. 11, 2018

(65) Prior Publication Data
US 2019/0193859 A1 Jun. 27, 2019

Related U.S. Application Data

(60) Provisional application No. 62/608,746, filed on Dec. 21, 2017.

(51) Int. Cl.
*B64D 11/02* (2006.01)

(52) U.S. Cl.
CPC ................... *B64D 11/02* (2013.01)

(58) Field of Classification Search
CPC ......... B64D 11/02; B64D 11/04; B60R 15/00; B60R 15/02; B60R 15/04; B60R 7/06; B60R 2011/0005; B61D 35/00; B61D 35/002; B61D 35/005; B61D 35/007; B63B 29/14; A47K 4/00; A47K 1/02; E03C 2201/90; A61G 5/1002
USPC .................. 4/136, 316; 296/37.12
See application file for complete search history.

(56) References Cited

U.S. PATENT DOCUMENTS

| | | | | |
|---|---|---|---|---|
| 5,465,660 A | * | 11/1995 | Conti | B64D 11/0007 100/48 |
| 7,284,287 B2 | * | 10/2007 | Cooper | B64D 11/02 4/664 |
| 7,866,603 B2 | * | 1/2011 | Cooper | B64D 11/02 244/118.5 |

(Continued)

FOREIGN PATENT DOCUMENTS

| EP | 2724937 A1 | 4/2014 |
|---|---|---|
| EP | 2873616 A1 | 5/2015 |

(Continued)

*Primary Examiner* — Richard R. Green
*Assistant Examiner* — Arfan Y. Sinaki
(74) *Attorney, Agent, or Firm* — Lerner, David, Littenberg, Krumholz & Mentlik, LLP

(57) ABSTRACT

In one embodiment, a dual configuration aircraft lavatory includes a plurality of walls enclosing and defining a lavatory interior space, wherein one of the walls is coextensive with a portion of the cabin. Within the lavatory interior space are a toilet, a washing station and a waste receptacle movable between a first position and a second position. In the first position, the waste receptacle is attached to a wall of the lavatory between the washing station and a door wall. In the second position, the waste receptacle occupies a second predetermined volume of space in the aircraft cabin separated from a first predetermined volume of space occupied by the waste receptacle in the first position. Moving the waste receptacle from the first position to the second position reveals additional space within the lavatory sufficient so that two adult humans simultaneously fit within the lavatory interior space.

20 Claims, 5 Drawing Sheets

(56) References Cited

U.S. PATENT DOCUMENTS

| | | | |
|---|---|---|---|
| 8,424,130 B2 * | 4/2013 | Dannenberg | B64D 11/02 4/664 |
| 8,770,517 B2 * | 7/2014 | Boren | B64D 11/02 244/118.5 |
| 9,452,837 B2 * | 9/2016 | Koyama | B64D 11/02 |
| 2012/0137902 A1 * | 6/2012 | Cunningham | B30B 9/3075 100/35 |
| 2012/0261509 A1 | 10/2012 | Grant et al. | |
| 2013/0001359 A1 | 1/2013 | Schliwa et al. | |
| 2014/0054416 A1 | 2/2014 | Lee | |
| 2014/0077033 A1 | 3/2014 | Scown et al. | |
| 2014/0083012 A1 | 3/2014 | Boren | |
| 2014/0117156 A1 | 5/2014 | Boren | |
| 2014/0123571 A1 | 5/2014 | Swain | |
| 2014/0196206 A1 * | 7/2014 | Savian | A47K 4/00 4/664 |
| 2014/0196372 A1 | 7/2014 | Boren et al. | |
| 2014/0250792 A1 | 9/2014 | Curtis et al. | |
| 2014/0291446 A1 | 10/2014 | Reams et al. | |
| 2015/0151842 A1 | 6/2015 | Weixler | |
| 2015/0298809 A1 * | 10/2015 | Minegishi | A62C 3/00 244/118.5 |
| 2016/0009396 A1 | 1/2016 | Seibt | |
| 2017/0043875 A1 * | 2/2017 | Vervaet | A47K 4/00 |
| 2018/0265202 A1 * | 9/2018 | Koyama | B65F 1/1426 |
| 2019/0127068 A1 * | 5/2019 | Scoley | B64D 11/02 |

FOREIGN PATENT DOCUMENTS

| | | |
|---|---|---|
| WO | 2011101385 A2 | 8/2011 |
| WO | 2012110643 A1 | 8/2012 |
| WO | 2013123065 A1 | 8/2013 |
| WO | 2013123075 A1 | 8/2013 |
| WO | 2013123080 A1 | 8/2013 |
| WO | 2013124008 A1 | 8/2013 |
| WO | 2014012746 A1 | 1/2014 |
| WO | 2014130590 A1 | 8/2014 |
| WO | 2014154758 A1 | 10/2014 |
| WO | 2017043177 A1 | 3/2017 |

* cited by examiner

DUAL CONFIGURATION LAVATORY WITH ASSIST SPACE

CROSS-REFERENCE TO RELATED APPLICATIONS

This application claims the benefit of the filing date of U.S. Provisional Patent Application No. 62/608,746 filed Dec. 21, 2017, the disclosure of which is hereby incorporated herein by reference.

BACKGROUND OF THE INVENTION

Over time, air travel has become ubiquitous and as such aircraft carry passengers with a wide range of needs, including needs associated with limited mobility. For those passengers having special needs including those who are impaired, handicapped, or elderly, thereby causing reduced mobility, moving around on an aircraft may be difficult. Moreover, accessing a lavatory is no exception to this difficulty. Indeed, for many of these passengers, the assistance of another person is necessary to access and properly use a lavatory. Some passengers may require the use of an aisle wheelchair and thus require lavatories with certain dimensions and a particular arrangement of fixtures so that use of the lavatory with the aisle wheelchair is possible.

However, in many aircraft, particularly smaller aircraft with a single aisle configuration, lavatories are small and cannot accommodate more than one adult person at a time or a person in an aisle wheelchair. Even in instances where a person in an aisle wheelchair can enter a lavatory, access to the sink may be limited due to its position close to an inside, aisle facing wall of the lavatory, making it difficult to reach. And entering a lavatory does not mean that they can sit on or rise up from the provided toilet.

Thus, a need exists for lavatories onboard vehicles designed for long distance travel, such as aircraft, that can accommodate various persons requiring the need of assistance or the use of an aisle wheelchair to access and use a lavatory, or to permit the assistance of a second person while the lavatory door is closed.

BRIEF SUMMARY OF THE INVENTION

Various aspects of the present invention relate to structures and associated methods for selectively increasing a space usable by passengers inside an aircraft lavatory and otherwise improving ease of use and accessibility therein.

Increased usable space in a lavatory is achieved through any one or a combination of several innovations described herein. The inclusion of a removable waste receptacle inside the lavatory is one such innovation. With this feature, the lavatory is a dual-configuration structure: a first configuration with the waste receptacle in a secured position within the lavatory and a second configuration with the waste receptacle removed from its secured position. To create space within the lavatory, the second position of the waste receptacle is located away from spaces inside the lavatory that may be occupied by users of the lavatory or other individuals providing assistance.

In some embodiments, the second position of the waste receptacle is located outside of the lavatory entirely. In other embodiments, it may be stowed below the floor in the lavatory in a stowage volume of the aircraft. In still further embodiments, the second position may be in or on a ceiling within the lavatory, where the waste receptacle is secured, accompanied by structure to allow lavatory occupants to move it into such a position. It could also be pushed into a compartment disposed in the wall behind the waste receptacle outside of the floor space of the lavatory. The waste receptacle could also be sized and shaped such that it can be stowed under a sink or other within a console provided in the lavatory. The waste receptacle is preferably securable within the lavatory sufficiently to meet regulations and provide a safe environment for passengers and crew and yet be stowable, either in a specially designed space within and/or outside of the lavatory or in some other existing space. At the same time the waste receptacle should be removable so as to create more passenger-usable floor space, and/or three dimensional space in the lavatory. In some embodiments, the waste receptacle is sized and shaped to be stowed in in an existing area of the cabin dedicated to some other purpose, such as in the galley in spaces normally occupied by food preparation and storage carts. In some embodiments, the waste receptacle is dimensioned such that it is lower, narrower and/or shallower than at least one portion of another service console within the lavatory, such as one including a sink or storage. In particular, providing a shallower profile provides additional passenger usable floor space. In still another embodiment, the waste receptacle is sufficiently narrow that when secured within the lavatory in a position enabling it to function as a waste receptacle, it is narrower than a portion of a console housing the sink.

Another aspect of the invention is the placement and releasable securing of the waste receptacle. Not only must a securing device or arrangement be provided on the waste receptacle, on or in the lavatory, or both which allows the waste receptacle to be easily secured and detached, but it must be located such that the waste receptacle is in an appropriate position to improve access and use in an aisle wheelchair and/or by an attendant within the cabin. Aisle wheelchairs compatible with commercial aircraft are typically 457 mm (18 inches) wide. Accordingly, references to aisle wheelchair herein are references to a specialized wheelchair smaller than those typically used by the disabled individuals outside of an aircraft. Aisle wheelchairs as referenced herein are also known as transfer chairs and mobile chairs.

In one preferred arrangement, the waste receptacle is secured on a rear or forward facing wall of the lavatory extending between an outer wall and a door wall and separates a sink from the inner door wall of the lavatory. Through securement at this location, the waste receptacle, which is in some embodiments, shallower, i.e., narrower, than the sink or sink-containing console, provides additional space for movement by a passenger even when the waste receptacle is secured against the rear or forward facing wall. Removal of the waste receptacle provides additional space for a user in an aisle wheelchair disposed in the chair and/or to rise from or sit back down onto the chair or which may be occupied by a second person in the lavatory. The location of the additional space renders the provision of assistance easier than it would be were the space created in another location in the lavatory.

Another aspect of the invention relates to features of a washing station in the lavatory. In some embodiments, the washing station includes a sink positioned at an angle relative to a wall extending between an outer wall and a door wall and is disposed sufficiently distant from the door wall of the lavatory so as to create additional passenger usable space for an assistant or a passenger in a wheeled chair or transfer chair at least when the waste receptacle is removed from the lavatory. In some embodiments, the location and angled placement of the sink allows lavatory users entering the lavatory on an aisle wheelchair to access the sink while on the wheelchair and while on the toilet, due to the angle and position of the sink away from the door wall. In another embodiment, the location and placement of the sink allows for an aisle chair to be placed in the lavatory such that the user seated is facing a direction parallel to the door or innermost wall of the lavatory. It also, alone or in combination with a shallower waste receptacle, provides sufficient space for a wheeled chair or transfer chair. And, particularly when the waste receptacle is removed, the position of the sink and or other consoles within the lavatory provide additional floor space for an attendant to stand within the lavatory to assist the user.

In an embodiment, the modified lavatory occupies the same amount of space within the cabin of a vessel, such as an airplane, as an existing lavatory.

Another aspect of the invention is the recognition that you need specifically identified usable space within an interior of a lavatory to improve its functionality and to increase its usefulness for its intended purposes. The specifically identified useful space accomplishes this by providing room for greater freedom of movement in the lavatory and by making it possible for a second person to be inside the lavatory. This aspect also involves the recognition that the specifically identified usable space can be created through temporarily displacing, resizing or altogether eliminating traditional fixtures or parts within a lavatory, such as a waste receptacle.

Another aspect of the invention involves a method of modifying an interior space within a dual configuration aircraft lavatory. In one embodiment of the method, a waste receptacle in a first position releasably attached to a wall and/or a washing station in the lavatory is detached. Then, the waste receptacle is moved to a second position revealing an unobstructed volume of space inside the lavatory between the washing station and an inner door wall that was previously occupied by the waste receptacle in the first position. The movement of the waste receptacle into the second position creates space in the lavatory sufficient for two adult humans to fit inside simultaneously. The second position may be a food storage location in a galley of the aircraft, it may be below a floor in the lavatory, or it may be in other locations as described above. Due to the location of the additional space in the lavatory in the second configuration, a second adult human is able to reach the additional space and provide assistance to a lavatory user from that location without significant difficulty. In some embodiments, the sink is angled, providing even greater unimpeded access between a second person providing assistance and a first person requiring assistance.

In an aspect of the invention that relates to an aircraft with lavatory, one embodiment of an aircraft includes a dual configuration aircraft lavatory for single person use or assisted person use. The aircraft includes an aircraft body and a lavatory structure. The aircraft body contains an aircraft cabin that has a longitudinal length between a front of the cabin and a rear of the cabin. The aircraft cabin also includes a lateral width between opposite first and second interior sidewalls, the sidewalls extending upwardly and curving laterally toward each other to a roof of the aircraft cabin. The aircraft cabin also includes a floor surface. The lavatory structure is located in the aircraft cabin and is positioned in an area between the floor surface and the first interior sidewall. The lavatory structure includes a plurality of walls enclosing and defining a lavatory interior space. One of the plurality of walls is coextensive with a portion of the first interior sidewall. Included inside the lavatory interior space is a toilet, a washing station and a waste receptacle. The waste receptacle is moveable between a first position and a second position. The waste receptacle is in the first position when releasably attached to the washing station, one or more of the plurality of walls, or both. The waste receptacle is in the second position when it occupies a second predetermined volume of space in the aircraft cabin separated from a first predetermined volume of space occupied by the waste receptacle in the first position. The waste receptacle is movable such that when the waste receptacle is moved from the first position to the second position, additional space is revealed within the lavatory structure that is sufficient so that two adult humans simultaneously fit within the lavatory interior space.

In some arrangements, the additional space created when the waste receptacle is in the second position may be located in between the washing station and an inner wall of the plurality of walls opposite the first interior sidewall, and one of the two adult humans may occupy the additional space when two adult humans are inside the lavatory structure. In some examples of these arrangements, the additional space may cover a lavatory floor area of at least 0.12 square meters.

In some arrangements, the aircraft cabin may include a single aisle along the longitudinal length and the lavatory structure may be positioned between the aisle and the first interior sidewall. In other arrangements, the waste receptacle may have a size corresponding to a half galley cart. In further arrangements, the waste receptacle may be in the second position when attached at a securement interface in a cabin galley.

In some arrangements, the waste receptacle may be slidingly removable from the first position. In some examples of these arrangements, the waste receptacle may be in the second position when external to the lavatory structure and a wheel lock of the waste receptacle is activated. In other examples, the lavatory interior space may have a first unobstructed volume when the waste receptacle is in the first position and a second unobstructed volume larger than the first unobstructed volume when the waste receptacle is in the second position. In still further examples, the second unobstructed volume may be at least 4% greater than the first unobstructed volume.

In some arrangements, the lavatory structure of the aircraft also includes a stowage space below the lavatory interior space. In some examples of these arrangements, the stowage space may have a volume sufficient so that the waste receptacle is disposable therein. In further examples, the waste receptacle may be in the second position when positioned in the stowage space. In still further examples, the lavatory structure may also include a floor area that includes a door providing access to the stowage space when opened. The door may be located and openable so that the waste receptacle is slidable between the first position and the second position.

In some arrangements, the waste receptacle may be in the second position when positioned entirely above the first predetermined volume of space. In some examples of these arrangements, the waste receptacle may be attached to at least one wall of the plurality of walls in the second position. In other arrangements, the washing station may include a sink positioned within the lavatory interior space. The sink may be positioned in a manner such that it is reachable by a hand of an adult human while the adult human is disposed on the toilet and is also reachable while the adult human is seated in an aisle wheelchair on a floor area adjacent the toilet within the lavatory structure. In some examples of these arrangements, the sink may have a long dimension oriented at an angle between 40 and 50 degrees relative to a rear wall of the plurality of walls that faces the rear of the cabin, the washing station positioned against the rear wall.

In some arrangements, the sink may extend further from a rear wall of the plurality of walls that faces the rear of the cabin than the waste receptacle.

In another embodiment, an aircraft includes a dual configuration aircraft lavatory for single person use or assisted person use. In particular, the aircraft includes an aircraft body and a lavatory structure. The aircraft body contains an aircraft cabin with a longitudinal length between a front of the cabin and a rear of the cabin and a lateral width between opposite first and second interior sidewalls extending upwardly and curving laterally toward each other to a roof of the aircraft cabin. The aircraft cabin also includes a floor surface. The lavatory structure is located in the aircraft cabin and is positioned in an area between the floor surface and the first interior sidewall. The lavatory structure includes a plurality of walls including a first lateral wall, a second lateral wall, an outer wall, and an inner wall enclosing and defining a lavatory interior space. The outer wall is coextensive with a portion of the first interior sidewall and the inner wall is parallel to an aisle adjacent to the lavatory structure. The lavatory structure also includes a toilet inside the lavatory interior space that is positioned adjacent to the first lateral wall and the outer wall along with a washing station inside the lavatory interior space. The washing station is positioned adjacent to the second lateral wall and the outer wall and includes a sink having a long dimension non-parallel to a length of the second lateral wall so that the sink is accessible by an adult human disposed on the toilet while also being accessible by an adult human disposed in an aisle wheelchair in a space adjacent to the toilet. In the first position, the waste receptacle is releasably attached to the washing station and the second lateral wall. In the second position, the waste receptacle is positioned external to the lavatory structure. The waste receptacle is movable such that when the waste receptacle is moved from the first position to the second position, additional space is created within the lavatory structure between the washing station and the inner wall sufficient so that two adult humans simultaneously fit within the lavatory interior space. The additional space created may be between 0.1 and 0.2 cubic meters.

In some arrangements, the long dimension of the sink may be oriented at an angle between 40 and 50 degrees relative to the second lateral wall. In some examples of these arrangements, the sink includes a portion at a first distance from the outer wall and the toilet includes a portion at the first distance from the outer wall.

In some arrangements, the waste receptacle may be adapted to support a load of up to 12 kilograms disposed therein. In other arrangements, the lavatory structure may be sized to fit between an aisle and the first interior sidewall when the aircraft is configured so that the aisle is the only aisle along a length of the cabin. In other arrangements, when the waste receptacle is in the second position, space within the lavatory structure may be sufficient so that one adult human seated in an aisle wheelchair and another adult human in a standing position simultaneously fit within the lavatory interior space.

In another embodiment, a dual configuration aircraft lavatory for single person use or assisted person use includes a plurality of walls, a washing station, a toilet, a floor area and a waste receptacle. The plurality of walls include a first wall that is coextensive with a portion of an aircraft cabin sidewall. The plurality of walls enclose a first subarea, a second subarea, a third subarea and a fourth subarea combined to define a cross-sectional area enclosed by the plurality of walls. The washing station is located inside the lavatory and corresponds to the first subarea. The toilet is also located inside the lavatory and corresponds to the second subarea. The floor area is directly below an unobstructed space, sufficient for substantial occupation by an adult human, and corresponds to the third subarea. The waste receptacle is movable between a first position and a second position. The waste receptacle is in the first position when it is inside the lavatory and is releasably attached to the washing station, one or more of the plurality of walls, or both. In the first position, the waste receptacle corresponds to the fourth subarea. The waste receptacle is in the second position when the third and fourth subareas are both free of obstructions so that two adult humans can substantially occupy a combined space above the third and fourth subareas.

In some arrangements, the fourth subarea may be at least 0.12 square meters. In other arrangements, the third and fourth subareas have a combined area at least 16% greater than the third subarea.

In another embodiment, an aircraft includes a dual configuration aircraft lavatory for single person use or assisted person use. In particular, the aircraft includes an aircraft body containing an aircraft cabin with a longitudinal length between a front of the cabin and a rear of the cabin and a lateral width between opposite first and second interior sidewalls extending upwardly and curving laterally toward each other to a roof of the aircraft cabin. The aircraft also includes a floor space and a lavatory structure within the aircraft cabin. The lavatory structure is positioned in an area between the floor surface and the first interior sidewall. The lavatory structure includes a plurality of walls including a first lateral wall, a second lateral wall, an outer wall, and an inner wall enclosing and defining a lavatory interior space. The outer wall is coextensive with a portion of the first interior sidewall and the inner wall is parallel to an aisle adjacent to the lavatory structure. The lavatory structure also includes a toilet inside the lavatory interior space that is positioned adjacent to the first lateral wall and the outer wall and a washing station inside the lavatory interior space that is positioned adjacent to the second lateral wall and the outer wall. The washing station may include a sink having a long dimension oriented at an angle between 40 and 50 degrees relative to the second lateral wall so that the sink is accessible by an adult human disposed on the toilet along with an adult human disposed in an aisle wheelchair in a space adjacent to the toilet. The sink may include a portion at a first distance from the outer wall while the toilet also includes a portion at the first distance from the outer wall. The waste receptacle may be adapted to support a load of up to 12 kilograms disposed therein. Further, the waste receptacle may be releasably attached to the washing station and the second lateral wall in the first position. Still further, the waste receptacle may be positioned external to the lavatory structure in the second position. The waste receptacle may be movable such that when the waste receptacle is moved from the first position to the second position, additional space is created within the lavatory structure between the washing station and the inner wall sufficient so that two adult humans simultaneously fit within the lavatory interior space. The additional space created may be between 0.1 and 0.2 cubic meters. The lavatory structure may be sized to fit between an aisle and the first interior sidewall when the aircraft only includes a single aisle along a length of the cabin.

Another aspect of the invention relates to a method of assembling a dual configuration aircraft lavatory. In one embodiment, a method involves the following steps: providing a plurality of wall panels; providing a floor panel; securing the plurality of wall panels to one another and to the floor panel thereby enclosing and defining a lavatory interior space; attaching a toilet and a washing station to at least one of the plurality of wall panels and floor panel within the lavatory interior space; and attaching a waste receptacle to at least one of the plurality of wall panels and floor panel at a location separate from the toilet and the washing station within the lavatory interior space. In this method, the waste receptacle may be removably attached such that it is removable in its entirety. The waste receptacle may also occupy a space sufficient for substantial occupation by an adult human when the waste receptacle is entirely removed from its attachment location.

In some arrangements, attaching the washing station involves orienting the washing station so that an axis through a long dimension of the sink is transverse to a wall abutting the washing station such that the washing station is angled relative to the wall. In other arrangements, attaching the waste receptacle involves positioning the waste receptacle in between the washing station and a wall opposite another wall abutting both the toilet and the washing station.

Yet another aspect of the invention relates to a method of modifying an interior space within a dual configuration aircraft lavatory. In one embodiment, a method includes: detaching a waste receptacle in a first position releasably attached to at least one of a wall of a lavatory or a washing station in the lavatory; and moving the waste receptacle to a second position revealing an unobstructed volume of space inside the lavatory previously occupied by the waste receptacle in the first position. When the waste receptacle is moved into the second position, the lavatory may have sufficient space for two adult humans to fit inside simultaneously.

In some arrangements, the unobstructed volume of space revealed through the movement of the waste receptacle may be sufficient for an adult human to stand on a floor surface directly below. In other arrangements, the moving step may include taking the waste receptacle outside of the lavatory to place the waste receptacle in the second position.

BRIEF DESCRIPTION OF THE DRAWINGS

In the following, exemplary embodiments are described in more detail with reference to the attached drawings. The drawings are schematic and not to scale. Like reference numerals refer to like elements.

DETAILED DESCRIPTION

Although the embodiments herein are described in the context of an aircraft, it is contemplated that the lavatory of the present invention may also be used in vehicles other than aircraft including, for example, passenger transport vehicles, ships, ferries, trains and motorhomes. Other vehicles may also benefit from the lavatory structures and methods described herein where such vehicles have limited space for a lavatory and a lavatory is otherwise required.

Figure 6:
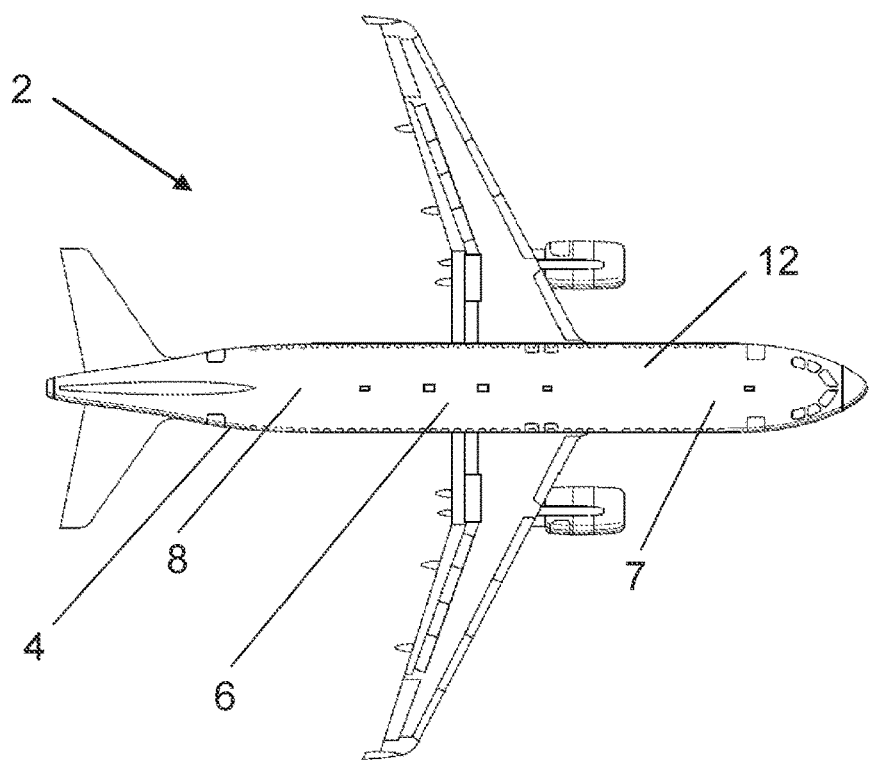
FIG. 6 illustrates a top view of an aircraft.

Most if not all commercial aircraft include a cabin with one or more lavatories disposed therein. In one aspect, the present invention relates to a dual configuration lavatory within a cabin 6 in a body 4 of an aircraft 2, as shown, for example, in FIG. 6. The cabin 6 of the aircraft is defined by inner sidewalls extending around its perimeter so that an inner sidewall on one side of the cabin arcs toward another inner sidewall on the opposite side, meeting at a highpoint or roof 12 of the cabin. A floor having a floor surface within the cabin separates a passenger portion of the cabin from a stowage portion and extends across a lateral width between opposing sides of the inner sidewall. Positioned within an aircraft, a lavatory of the embodiments described herein is typically positioned in the passenger portion between an aisle and an inner sidewall of the cabin so that one wall of the lavatory is curved in a manner corresponding to the inner sidewall. Within these general parameters, the lavatory may be positioned at any location on a length of the cabin from a front end 7 of the cabin through a rear end 8 of the cabin 6. The embodiments described herein find particular advantage when applied in lavatories of single aisle aircraft, due to lavatory space constraints that are more severe than those in double aisle aircraft.

Figure 1:
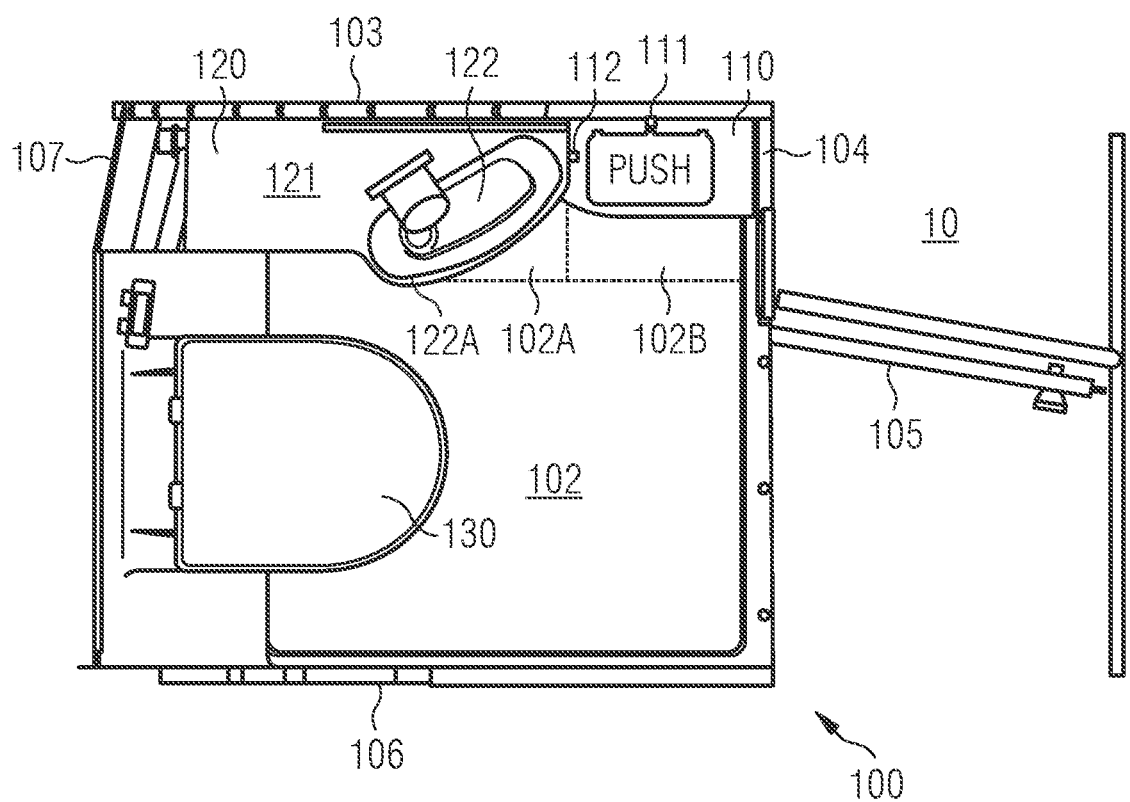
FIG. 1 illustrates a top view of an aircraft lavatory with a waste receptacle in a first position.

In one embodiment, an aircraft lavatory 100 is a structure as depicted in FIG. 1. Lavatory 100 is enclosed by a plurality of wall panels, also referred to as walls, the plurality of walls defining a lavatory interior space. The plurality of walls include a rear wall 103, an inner wall 104, a door 105 forming part of inner wall 104 when door 105 is closed, forward wall 106 and outer wall 107. The term lateral wall is also used in the specification to refer to either the rear or forward wall. Outer wall 107 is coextensive with a portion of the inner sidewall of the cabin. Door 105 is a lavatory door having a width capable of accommodating an aisle wheelchair. As depicted, door 105 is openable into an aisle 10 adjacent to the lavatory via a hinge in wall 104. Of course, other door configurations as known in the art are also contemplated.

The lavatory interior space is bounded by the plurality of walls as noted above and a floor panel, of which floor area 102 exposes in part, as shown in FIG. 1. Where the lavatory is a modular structure, the floor area is part of a panel separate from the cabin floor, though the embodiments herein are not limited to such a configuration. Although not visible in FIGS. 1-3, an upper bound of the lavatory interior space is either outer wall 107 as it curves inward (not shown) moving away from floor area 102, or a bulkhead attached below or integral to outer wall 107. A variety of fixtures are included inside the lavatory to provide it with functionality and also to improve ease of use. These include a waste receptacle 110, a washing station 120 and a toilet 130.

Toilet 130 is shown inside lavatory 100 in FIG. 1. Toilet 130 has dimensions compliant with applicable aviation regulations, including its length, width and height as measured from a surface of floor area 102. As depicted, toilet 130 is positioned at a corner of the lavatory between outer wall 107 and forward wall 106.

Washing station 120 includes a table 121 and a sink 122. As with toilet 130, dimensions of washing station 120 are compliant with applicable aviation regulations, including its height, length and width. Through compliance with regulations, the height of the washing station allows use by those seated in an aisle wheelchair. Washing station 120 is positioned at a corner of the lavatory between outer wall 107 and rear wall 106. Sink 122 is positioned at an inner end of table 121 at a distance from outer wall 107 slightly further than an inner end of toilet 130 but still spaced apart from inner wall 104 by waste receptacle 110. Sink 122 is also at a distance from rear wall 103 approximately corresponding to the width of table 121, the width measured in parallel with the length of the aircraft. In one example, as depicted in FIG. 1, an inner end 122A of sink is 254 mm from rear wall 103. This position of the sink relative to the walls of the lavatory interior space allows waste receptacle 110 to be placed directly adjacent to inner wall 104, the advantages of which are made apparent in the discussion below. Sink 122 includes a long dimension with an axis therethrough that is transverse to a plane through rear wall 106. The axis through the long dimension in the embodiment depicted in FIG. 1 is approximately 45 degrees relative to the plane through rear wall 106 (not shown to scale). In variants, the angle may be between 10 degrees and 80 degrees, preferably between 25 degrees and 65 degrees, and more preferably between 40 degrees and 50 degrees. The combination of the position of sink 122 relative to inner wall 104 and rear wall 103, and its angulation relative to rear wall 103, provides additional space 102A (FIG. 1) within floor area 102 for lavatory users to maneuver while also making it possible for a user to reach the sink from a position on floor area 102 or toilet 130. In one example, as depicted in FIG. 1, additional space 102A is a volume above an area measuring approximately half of 50 mm by 100 mm. In some variants, washing station may include internal components designed and intended for use in small lavatories that are not accessible with an aisle wheelchair. These internal washing station components include the water heater and filter, among others, and through their inclusion a size of the washing station may be reduced while maintaining its function. In this manner, washing station may occupy a smaller volume than a typical washing station that utilizes standard size components. Or, the smaller components may be used to free up space inside the washing station for disposition of the waste receptacle, described further below. Exemplary small lavatory components include those utilized in the Airbus® Smart Lavatory, described, for example, in WO 2013/124008, hereby incorporated by reference herein in its entirety.

Although toilet 130 and washing station 120 are depicted as separate structures, in some variants they may also form a monolithic structure.

In some embodiments, waste receptacle 110 is of a size corresponding to a half galley cart. In some examples, it may be constructed through a retrofit of an existing half galley cart. In other examples, it may be constructed from the parts of a half galley cart. Waste receptacle 110 may include an openable door thereon providing access to an interior volume of waste receptacle 110. In one embodiment, at a base of waste receptacle 110 are a plurality of wheels (not shown), although it is contemplated that the waste receptacle may have no wheels. Waste receptacle 110 may also include a locking mechanism 111, 112 designed to interface with at least one of a washing station locking feature, a floor locking feature, a side wall locking feature and a rear wall locking feature, respectively, as shown in FIG. 1. The locking mechanism is standard and known to those of ordinary skill. In some examples, off the shelf locking device components are used for the locking mechanism.

Figure 5:
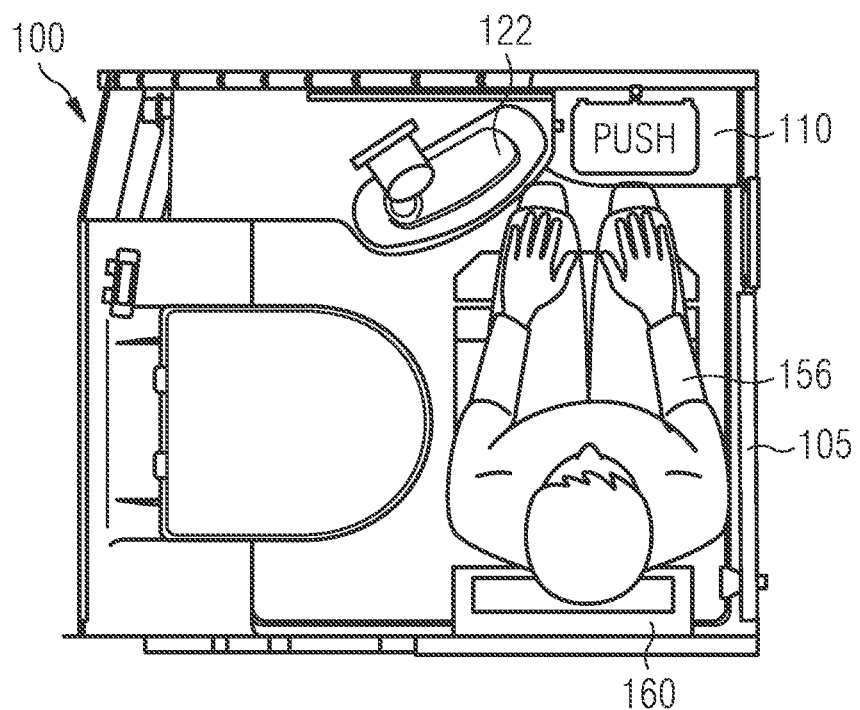
FIG. 5 illustrates the aircraft lavatory of FIG. 1 with an aisle wheelchair user inside.

The attached position of waste receptacle 110 in between washing station 120 and inner wall 104 as shown in FIG. 1 provides numerous advantages. For one, a width, i.e., dimension in parallel with the length of the cabin, of waste receptacle 110 is less than a width of table 121, and, because of the position of the waste receptacle adjacent to inner wall 104, there is extra space 102B within floor area 102 for a lavatory user who enters the lavatory on an aisle wheelchair to fit on floor area 102 and rotate or otherwise turn the aisle wheelchair. The extra space 102B is immediately in front of waste receptacle 110. Further, the position of sink 122 at a distance from inner wall 104 and its angled orientation provide further space 102A to maximize improved accessibility already obtained through inclusion of a waste receptacle 110 that is narrow relative to washing station 120. In the embodiment depicted in FIG. 1, the width of waste receptacle 110 is 152 mm while the width of table 121 is just under 254 mm and extra space 102A, as noted above, is a volume above a corresponding floor area measuring about half of 100 mm×50 mm while extra space 102B is a volume above a corresponding floor area measuring 100 mm×254 mm. An example of how this additional space provides room for an aisle wheelchair user is shown in FIG. 5, where user 156 faces waste receptacle 110 and sink 122. More details on specific dimensions of waste receptacle 110 are provided below.

Although waste receptacle 110 is described in some embodiments as corresponding to a half galley cart, a particular configuration for the waste receptacle structure may be modified in some respects as deemed beneficial under applicable circumstances. For instance, the waste receptacle may be assembled from commonly available components. Commonly available components are not limited to those utilized in aircraft and may include, for example, plastics or other materials not used for galley carts. Further, in some instances, a size of the waste receptacle may be controlled by applicable air travel regulations. For example, if a first aircraft is intended for long range flights and carries fewer passengers per lavatory than a second aircraft, then a capacity of waste receptacle(s) in the first aircraft may be tailored to be higher than those in the second aircraft. In one example, the waste receptacle is sized and structured to accommodate up to 12 kilograms of waste. In other examples, the waste receptacle may accommodate up to 10, 15 or 20 kilograms of waste. When the capacity is larger, a volume occupied by the waste receptacle may correspond to that of a full galley cart. Through these variations, the waste receptacle may have a different width and/or have a different height. In circumstances where additional space within the lavatory is needed for users occupying the floor area, a width of waste receptacle may be narrower. Because waste receptacle is located adjacent to the inner wall, this creates additional space usable by the occupant to move around as necessary within the lavatory. A height of the waste receptacle may also be varied to alter the available space above the waste receptacle. This would provide additional room for a lavatory user at shoulder level, for example.

The locking mechanism 111, 112 allows for the releasable attachment of waste receptacle 110 to lavatory 100. Through this mechanism, the waste receptacle may be detached and reattached to the lavatory repeatedly. As visible in FIG. 1, when waste receptacle 110 is attached to lavatory 100, it abuts rear wall 103 and inner wall 104 toward a corner between both. This represents a first configuration of the lavatory. When waste receptacle 110 is secured within the lavatory as described above and shown in FIG. 1, it is in a first position.

Figure 3:
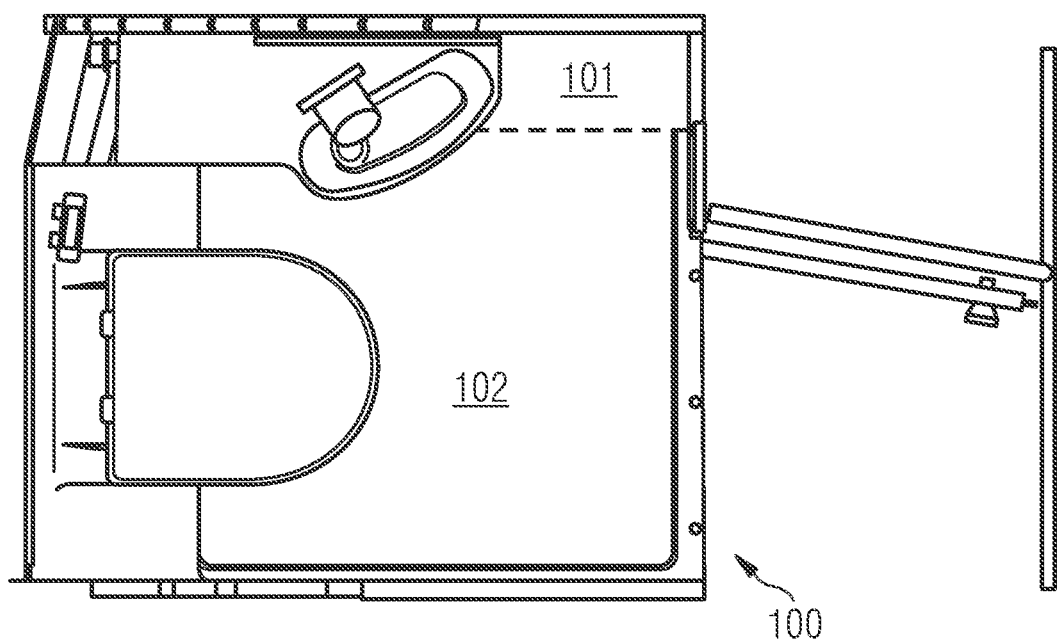
FIG. 3 illustrates the aircraft lavatory of FIG. 1 with the waste receptacle removed from the lavatory.
Figure 7:
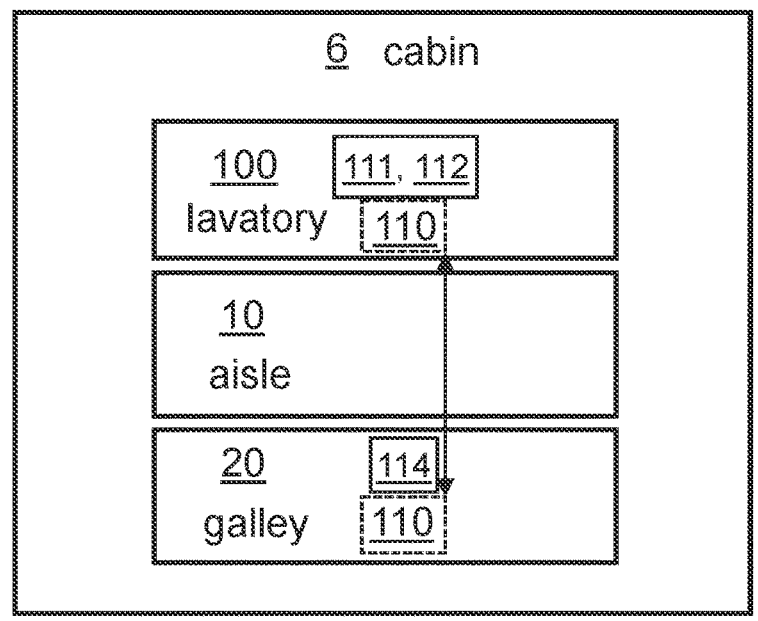
FIG. 7 illustrates an arrangement within an aircraft cabin.

When the waste receptacle 110 is detached from washing station 120 and rear wall 103 and repositioned outside of the lavatory, this represents a second configuration of the lavatory. Hence, the lavatory is dual-configuration. When the lavatory is in the second configuration, the waste receptacle is secured in a second position, such as in food storage areas in a galley 20 of the aircraft cabin 6 or in a secure location in or near the lavatory 100. A lavatory 100, aisle 10 and galley 20 of the cabin 6 are shown, for example, in FIG. 7, where waste receptacle 110 is shown as movable from a first configuration secured in the lavatory 100 to a second configuration secured to a securement interface 114 in galley 20. More detail regarding the second position of the waste receptacle is provided in the description of the method below. In the second configuration, an unobstructed volume within the lavatory interior space is greater than in the first configuration when waste receptacle 110 is in the first position. This additional unobstructed volume, directly above extra floor area 101 in FIG. 3, provides space so that a second adult human may join a first adult human in the lavatory at the same time, i.e., simultaneously. The space created is such that the second adult human can stand on, and thus substantially occupy, the additional unobstructed volume of space above the extra floor area 101. An adult human may occupy the space without the need to reach inside an enclosure.

In one example that quantifies the differences between the first and second configurations outlined above, an unobstructed volume of an aircraft lavatory with 914 mm×762 mm×2032 mm dimensions (30"×36"×80", where 36" is measured between cabin outer sidewall and door wall) is approximately 1.069 m$^3$ when waste receptacle 110 is in the first position and is approximately 1.115 m$^3$, when waste receptacle 110 is in the second position, an increase of over 4.3%. In this example, the waste receptacle is 305 mm×152 mm×1032 mm, making its volume approximately 0.046 m$^3$. The unobstructed volume of the lavatory is somewhat less than a volume based on the dimensions of the lavatory itself to account for space taken by the toilet and washing station. A size of the waste receptacle may also vary. Thus, in other examples with a lavatory having the same dimensions, the waste receptacle may be 406 mm×302 mm×1032 mm in size, the dimensions of some half galley carts. In these examples, an increase in the unobstructed volume in the lavatory is 12.7% with the waste receptacle removed. In other examples, the size of the waste receptacle may be even larger. As the above examples are merely illustrative, specific dimensions of each fixture and of the lavatory itself may vary.

In other examples, a size of the lavatory may be 762 mm×762 mm×2032 mm (30"×30"×80"), providing an unobstructed volume of approximately 0.880 m$^3$ when accounting for the toilet and washing station. With this lavatory, an increase in unobstructed volume with the removal of a waste receptacle 305 mm×152 mm×1032 mm in dimensions is 5.5%. When the waste receptacle is 406 mm×302 mm×1032 mm, an increase in unobstructed volume is 16.7%. Since a size of the lavatory, toilet, washing station and waste receptacle may all vary in further examples, a percentage increase in unobstructed volume in the lavatory between the first and second configurations may be 3%, 5%, 10%, 15%, 20%, amounts in between, or amounts even larger.

Yet another way that the creation of space in the lavatory can be described is that a first predetermined volume of the interior space becomes free for an adult human to enter when the lavatory is converted from the first to the second configuration. This first predetermined volume is the space occupied by the waste receptacle in the first position, and represents approximately 0.046 m$^3$ of space located toward an inner rear corner of the lavatory, as shown in FIG. 3 (the waste receptacle in FIG. 3 in the form of a half galley cart with dimensions of 305 mm×152 mm×1030 mm). Thus, once waste receptacle is displaced from the first position, approximately 0.046 m$^3$ of space becomes free for an adult human, such as lavatory assistant 154 shown in FIG. 4, to step into that volume so that both the assistant and lavatory user 152 may occupy the lavatory simultaneously. When the assistant stands in the newly created space, this can also be described as the assistant substantially occupying this space. Of course, where the waste receptacle is of a different size, the displaced volume will vary accordingly. Other non-limiting examples of the volume of the waste receptacle include 0.10 m$^3$, 0.13 m$^3$ and 0.20 m$^3$. The fixed volume of space where the waste receptacle is intended to be stored in the second position is a second predetermined volume. The second predetermined volume can be a food storage area in the galley, for example.

Another way of describing the dual configuration of lavatory 100 is to view the lavatory has having four subareas that combine to define a total cross sectional area of the lavatory interior space. Thus, in the first configuration, the washing station 120 corresponds to a first subarea, toilet 130 corresponds to a second subarea, floor area 102 corresponds to a third subarea and waste receptacle 110 corresponds to a fourth subarea, as shown in FIG. 1. In the second configuration, the first through third subareas remain the same, and the fourth subarea corresponds to extra floor area 101, as shown in FIG. 3. The interior unobstructed volume corresponding to subareas one through three remains the same in both configurations, while the volume in subarea four increases by an amount otherwise occupied by waste receptacle when in the first configuration. These four subareas may be used to characterize the space available for passengers inside the lavatory. Thus, when the waste receptacle is removed from subarea four to convert the lavatory to the second configuration, extra floor area 101 is exposed. In the depicted embodiment, removal of the waste receptacle reveals 0.046 m$^2$ of floor area (305 mm×152 mm) upon which a lavatory assistant may stand on to assist a lavatory user. Again, where waste receptacle is of a different size, the area that becomes available will vary accordingly. In the second configuration, there are no obstructions over the third and fourth subareas that would impede occupancy by two adult humans simultaneously over such areas. In one variant of this example, where a lavatory measures 914 mm from the door (e.g., door 105) to the inner sidewall of the cabin and is 762 mm wide, the third subarea is approximately 0.287 m$^2$ (third subarea based on a total floor area within floor area 102 including areas 102A and 102B, measured based on an area of 508 mm×500 mm combined with an area of 100 mm×330 mm) while the fourth subarea is 0.046 m$^2$. Thus, an increase in floor space that may be substantially occupied by passengers is 16% in this example. The area of the third and fourth subareas may vary in many ways, such as those described above where the lavatory and/or the waste receptacle has other dimensions.

More detail regarding how the waste receptacle is moved from the first position to the second position and secured thereat is provided in the description of the method below.

Occupancy by an adult human in the additional unobstructed volume when the lavatory is in the second configuration is made possible not only by the removal of the waste receptacle from the first position, but also by making the location of the revealed space within the lavatory appropriate to optimize access and use. In particular, extra floor area 101 is between sink 122 and inner wall 104. Because extra floor area 101 is adjacent to inner wall 104 and near door 105, an assistant entering lavatory 100 with a user can easily move to and occupy the space above extra floor area 101. Moreover, the position and angle of sink 122 within lavatory are such that an adult human standing over extra floor space 101 faces no obstructions when reaching or otherwise moving towards toilet 130 as the space 102A, 102B is unobstructed. In other words, there is nothing in between extra floor space 101 and toilet 130 that would encumber the efforts of an assistant helping a user of the lavatory, The dual configuration aircraft lavatory may be varied in many ways. For example, the waste receptacle may be secured to any one of or combination of an adjacent wall and the washing station at one point, two points, three points, and so on. In other examples, the fixtures are reversed so that toilet abuts the rear wall of the lavatory instead of the front wall and the washing station and the waste receptacle abut the front wall.

Figure 8:
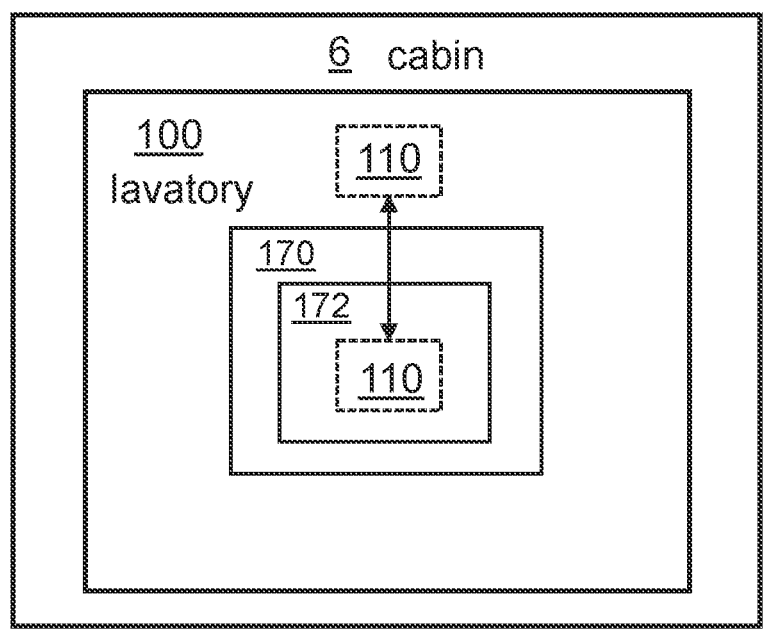
FIG. 8 illustrates an arrangement within a lavatory.

In still further examples, the lavatory itself includes structure to secure the waste receptacle in a second position. In one of these examples, the floor 9 of the lavatory includes a door 170 with a latch providing access to stowage space 172 below the lavatory, as depicted in FIG. 8. The stowage space 172 is customized to house the waste receptacle in a secure manner fully below the floor surface with the latch closed. In this example, the stowage space represents the second position of the waste receptacle and thus the second configuration of the lavatory. To ensure this manner of storage is a practical option, available stowage space and its location below the floor of the lavatory location in the designated aircraft should be evaluated prior to implementation, as certain smaller aircraft and/or lavatory locations may not have available stowage space directly below for the disposal of the waste receptacle therein.

In another example, a wall within lavatory includes a track or other guide structure that is dimensioned so that wheels on a side of the waste receptacle slide over the track and provide a second configuration where the waste receptacle is on the ceiling of the lavatory in a second position. To keep the waste receptacle in the second position on the ceiling, a locking mechanism is included on the ceiling. In a variant of this example, the ceiling includes additional stowage space for the waste receptacle, which may be enclosed in a bulkhead. In another example, the washing station has dimensions, along with internal components such as filter and water heater, sized and positioned so that the waste receptacle is positionable inside the washing station when additional space in the lavatory is sought. Such a configuration is more likely to be feasible with smaller waste receptacles sized to fit within whatever space is available under a wash station under particular circumstances. In yet another example, a fixture or console of the lavatory includes a recess sized to receive the waste receptacle when it is detached from its first position within the lavatory. In yet another example, an outer wall of the lavatory is equipped with an interface for securing the waste receptacle in the second position.

In any of the above embodiments, select lavatory features may be included in combination without the inclusion of all features. In one example, a lavatory includes a washing station having a length extending from the inner sidewall of the cabin to a location spaced apart from the inner wall of the lavatory. In between the washing station and the inner wall is a waste receptacle having a width shallower than the washing station. This configuration is advantageous to lavatory users because it provides additional space in front of waste receptacle through the difference in width between the washing station and the waste receptacle without having to detach the waste receptacle. The space created also improves the ability of aisle chair users to maneuver within the lavatory.

In another example, the lavatory includes a washing station and waste receptacle as described in the immediately preceding example, and also includes a sink positioned at an end of washing station angled relative to a lateral wall of the lavatory. Because the washing station is spaced apart from the inner wall, the sink is separated from the inner wall by the waste receptacle. This configuration is advantageous to lavatory users for the additional reason that it improves access to the sink due to the recess of the waste receptacle relative to the washing station and the position and angle of the sink at a distance from inner wall. It also further improves access and use by aisle chair users within the lavatory.

In an example incorporating the features of either of the above examples, the waste receptacle is releasably attached to a lateral wall and/or a washing station. In this example, the lavatory has two configurations where additional volume that may be occupied by an adult human is created through the removal of the waste receptacle from its position in between the inner wall and the washing station. When the waste receptacle is removed, a revealed space allows for occupancy by a second adult human simultaneously with a first adult human. In arrangements where the sink of the washing station is angled, unobstructed space between the second adult human and the toilet improves the ability of the second adult human to assist the first human.

In yet another example where the lavatory includes a washing station separated from an inner wall of the lavatory by a removable waste receptacle, the waste receptacle may be any width relative to a width of the washing station, and the washing station, other than its length measured parallel to the rear wall, may have features as desired. Nonetheless, this simple configuration still provides the advantage of additional space in a space adjacent to inner wall and a lateral wall of the lavatory when the waste receptacle is moved to a second position.

In other examples, a lavatory may include a waste receptacle shorter in height than a table of the washing station. Here, as with the other examples, the waste receptacle separates an inner wall of the lavatory from the washing station. An advantage of this configuration is that even when the waste receptacle is attached to a wall and/or washing station in the first position, additional unobstructed space is available above a top surface of the waste receptacle that allows for additional movement by the occupant(s) of the lavatory. This shorter waste receptacle may be used in conjunction with any of the previously mentioned washing stations including one only requiring a length not reaching the inner wall, one that is wider than a width of the waste receptacle, or one that includes a sink angled relative to a lateral wall behind the washing station.

In any of the above examples where the lavatory includes a removable waste receptacle, the waste receptacle may be moved to a second position in the galley 20 of the aircraft in a storage area for food carts, into an aisle 10 of the aircraft and locked in position, into the stowage area 172 below the lavatory, into a space on the ceiling of the lavatory, into a space inside the washing station or into a recess in a console within the lavatory.

In any of the above embodiments, the lavatory may include rails in one or more of the walls for use by those in a wheelchair or others needing assistance. In some variants, these rails may nest into a wall customized for such purpose.

In another aspect, the present invention relates to a kit of components for a modular dual configuration aircraft lavatory. In one embodiment, a kit includes a toilet, a wash station, a waste receptacle with a locking mechanism, a plurality of wall panels, and one or more floor panels. The kit may be varied in many ways. For example, a kit may include any number of the above components as part of a single kit. In some variants, a kit may include more than one type of toilet, wash station or waste receptacle. For example, a single kit may include one wash station with a sink angled at 45 degrees relative to a length of the wash station structure and another wash station with a sink angled at 25 degrees.

Figure 2:
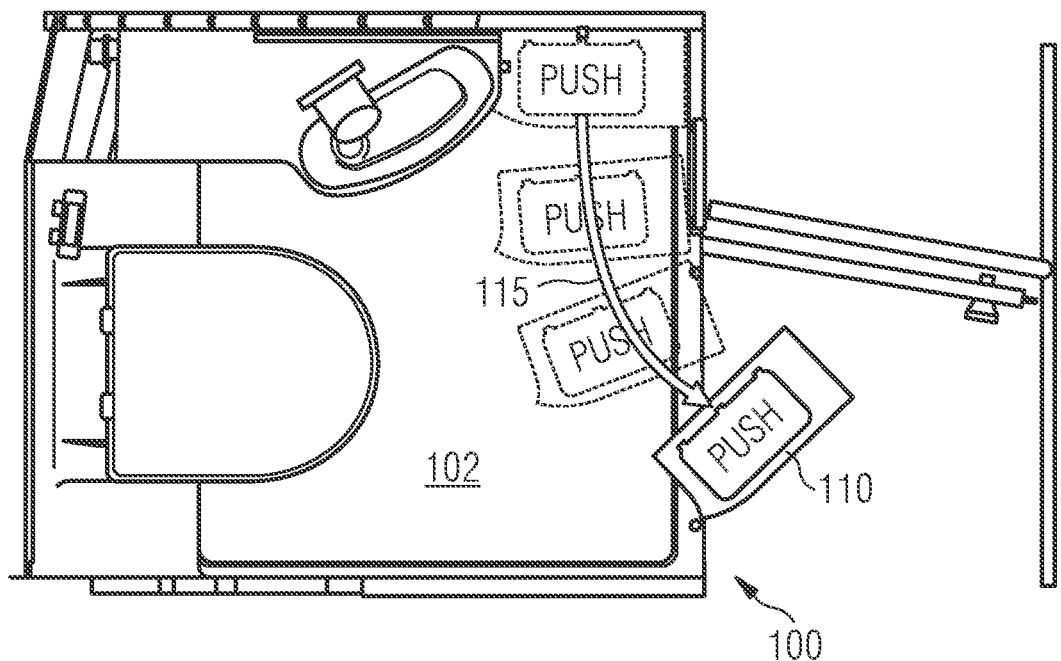
FIG. 2 illustrates the aircraft lavatory of FIG. 1 with the waste receptacle moved out of the first position.

In another aspect, the present invention relates to a method of assembly of a dual configuration aircraft lavatory. In one embodiment, assembly begins with the plurality of wall panels, including walls 103, 104, 106, 107, which are positioned relative to one another so as to create an enclosure therein. Before, during or after the positioning of the plurality of wall panels, the plurality of wall panels are secured to the floor panel. As shown in FIGS. 1 and 2 and described above, wall 104 includes door 105 therein. Once these panels are combined and fixed in the manner shown partially in FIG. 1, the lavatory is an enclosed structure and its walls and floor define a lavatory interior space.

Toilet 130, washing station 120 and waste receptacle 110 are then transported through door 105 into the lavatory interior space where they are secured to their respective positions as shown in FIG. 1. Points of securement for each of toilet 130 and washing station 120 may be determined by applicable aviation standards and regulations and as otherwise known to those of ordinary skill in the art. For waste receptacle 110, locking mechanisms 111, 112 are used to releasably secure it to an interface in rear wall 107 and washing station 120, respectively. Alternatively, each of the toilet 130, washing station 120 and waste receptacle 110 may be secured to the floor panel before walls 103, 104, 106, 107 and the floor panel are secured to one another to create the enclosure. Once these steps are complete, the lavatory is ready for transport into the cabin of the aircraft where it will be secured in position at a designated location.

In variants of the method of assembly, securement locations for the fixtures, the number of securement locations for the fixtures, and the details of the fixtures, such as the angulation of the sink, may vary in the many ways contemplated for the lavatory structure as described above.

Lavatory 100 as described herein has a footprint, i.e., cross-sectional area, measured parallel to the floor, and an overall size corresponding to that of existing aircraft lavatories, such as those on single aisle aircraft. In this respect, another aspect of the invention is the retrofit of existing lavatories to include the features of the dual configuration lavatory embodiments herein. For example, a toilet, washing station and waste receptacle may all be removed from a lavatory with a traditional configuration and be replaced with toilet 130, washing station 120 and waste receptacle 110, as described herein. In doing so, the advantages of the dual configuration lavatory are realized without having to assemble entirely new lavatories.

In yet another aspect, the present invention relates to a method of using the dual configuration aircraft lavatory. In one embodiment, lavatory 100 is converted into the second configuration so that two adult humans, a lavatory user 152 and a lavatory assistant 154, may enter and occupy lavatory 100 at the same time. To configure and use lavatory 100 in this manner, the assistant enters lavatory 100 first and removes (e.g., via unlocking of locking mechanism 111, 112) waste receptacle 100 from its securement in the first position. Waste receptacle 110 is then rolled out of lavatory on its wheels, depicted by the arrow identified through reference numeral 115 in FIG. 2. To stow waste receptacle 110 in the second position, waste receptacle 110 is rolled further into a galley in the cabin. In the galley, waste receptacle 100 is locked in place within a storage area having an interface designed for food carts or other similar carts (not shown). The waste receptacle 110 is in the second position when it is locked in the galley storage area and this defines the second configuration of the dual configuration lavatory. Alternatively, once waste receptacle 110 is in the aisle of the cabin, an internal locking mechanism may be activated to lock the wheels in place. Such a mechanism may be a foot pedal, for example. When waste receptacle is locked in place in the aisle of the plane, the position where it is locked becomes the second position, and the lavatory appears as shown in FIG. 3. In a variant, waste receptacle 110 includes no wheels, and is lifted from the first position to one of the second positions as described above.

Once the waste receptacle is securely in place in the second position, lavatory assistant 154 and lavatory user 152 enter the lavatory. Entry between the two individuals is in any order suitable under the circumstances dependent on the needs of the user. In one example, the assistant enters first and helps the user enter. In another, the user enters and waits over open floor area 102 while the assistant enters and stands over extra floor area 101 where the assistant can help user get onto toilet 130 or provide other assistance as necessary. Assistant 154, while positioned over extra floor area 101, may stand if desired. At any point in time after both user 152 and assistant 154 are inside the lavatory, either may close lavatory door 105. The above procedure may be performed where a lavatory user is able to enter the lavatory without a wheelchair, such as user 152 shown in FIG. 4, or where lavatory user is sitting in an aisle wheelchair. Thus, even where the lavatory user is in an aisle wheelchair, an assistant has sufficient room to enter the lavatory while the user in the wheelchair is inside.

Figure 4:
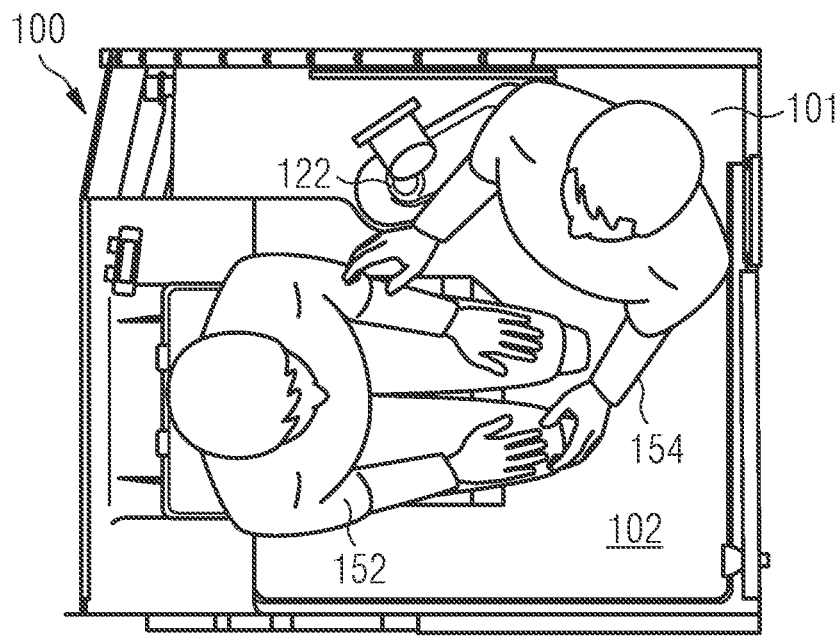
FIG. 4 illustrates the aircraft lavatory of FIG. 1 with a user and an assistant inside.

Once user 152 is disposed on toilet 130, assistant 154 provides assistance while over extra floor area 101 created through the removal and transport of waste receptacle 110 to the second position, as shown in FIG. 4. Assistance may include helping the user undress, helping the user onto the toilet and also helping the user clean the body. When washing station 120 is sized and includes sink 122 angled and located as shown, assistant 154 has direct access to toilet 130 from extra floor area 101 without obstructions. As visible in FIG. 4, both user 152 and assistant 154 are within reach of sink 122 while inside lavatory 100 at the same time. An ability for user 152 to reach sink 122 is made viable and otherwise improved over lavatory configurations having a sink parallel to a wall behind it due to the angle of sink 122 relative to rear wall 103.

When user 152 is ready to leave lavatory 100, the same process is repeated in reverse. Assistant 154 aids user 152 in getting up and then out of lavatory 100 into the adjacent aisle of the aircraft, and then assistant 154 proceeds to retrieve waste receptacle 110 from its storage in the second position so that it can be secured in the first position within the lavatory once again.

The method may also be performed using other waste receptacle securement configurations as described above. For example, assistant 154 may remove waste receptacle from the first position and open a door (not shown) in the floor of the lavatory so that the waste receptacle may be transported and then disposed therein in a second position. The door is then closed. In other examples, assistant 154 may detach the waste receptacle from its secure position in the lavatory and move it into a space under the washing station to a securement point there. In this way, additional space in the lavatory is created. Through this variant of the method, as with the others described herein, additional space is created in the lavatory interior space by moving the waste receptacle from the first position to the second position so that the lavatory is in the second configuration. Other steps involved in using the lavatory are otherwise the same as described above.

Figure 9:
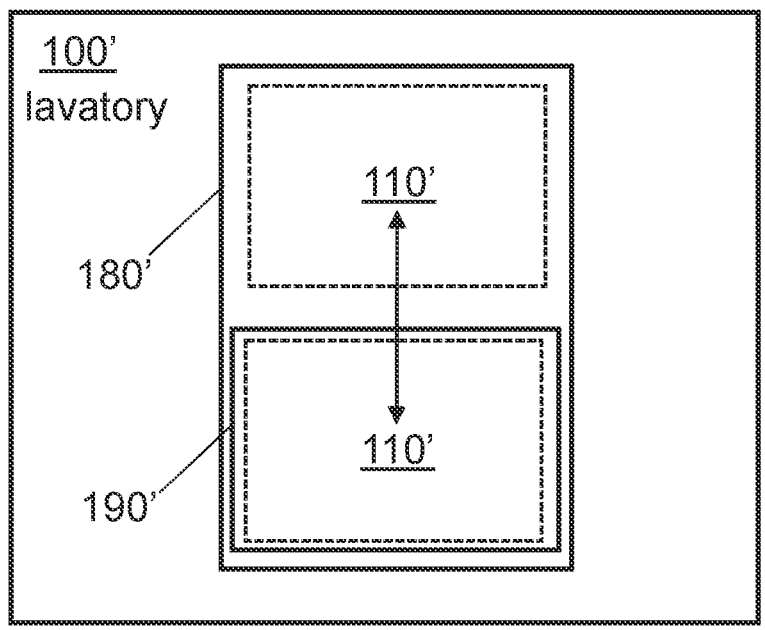
FIG. 9 illustrates a configuration for a waste receptacle in an aircraft lavatory according to one embodiment of the disclosure.

In another variant of the method, the method is performed in a lavatory 100' as shown in FIG. 9, where the 100' series of reference numerals refer to like elements of lavatory 100. In this variant of the method, a wall abutting the waste receptacle when it is in the first position 190' includes a structural guide 180' such as a rail to allow waste receptacle to be slid toward a ceiling of the lavatory interior space so that space is created for assistant 154 to stand over the extra floor area below the waste receptacle. In the ceiling region, the rail includes a locking feature so that waste receptacle 110 may be secured in place while user 152 and assistant 154 are both inside the lavatory. Other steps involved in using the lavatory are otherwise the same as described above.

In another embodiment, the dual configuration aircraft lavatory provides improved functionality and an improved experience for individual passengers, i.e., user 156, seated within aisle wheelchairs that require use of the lavatory. Such user 156 enters lavatory 100 through door 105 while seated on an aisle wheelchair 160. An aisle wheelchair is understood to be a size having a width capable of fitting within an aircraft aisle and through a lavatory door. In one example illustrating the applicable sizes, the door is 508 mm (20 inches) wide while the aisle wheelchair, as noted above, is 457 mm (18 inches) wide. Once inside lavatory 100, user 156 then rotates wheelchair 160 to face rear wall 103, as shown in FIG. 5. From this position, adult lavatory users, such as user 156, can comfortably reach sink 122. This is possible in part by the additional space created through the waste receptacle having a narrow structure relative to the washing station and by the angulation of the sink and its position separated from inner wall 104. These features create space over floor areas 102A, 102B within floor area 102 as identified in FIG. 1. Further, while user 156 is disposed on toilet 130, sink 122 remains within reach by user 156. Thus, lavatory 100 provides wheelchair users an improved lavatory experience. Although FIG. 5 depicts an adult inside the lavatory, the sink is designed to provide access for passengers having a wide range of statures and is not limited to adults of a particular size.

In some embodiments, this unique combination of elements and their arrangement can provide a lavatory that has greater functionality and convenience for users and yet occupies the same amount of space in a cabin as a conventional lavatory. It can therefore be modularly retrofitted into existing spaces. However, this invention will still provide improved functionality and flexibility in larger or expanded lavatories. And, while the lavatories described herein have primarily been described and illustrated in connection with lavatories in a single aisle airplane where one of the walls is adjacent outer wall of the airplane, these lavatories are equally useful in multi-aisle configurations and when disposed between aisles and/or away from the exterior walls of the airplane. And the invention can be used in other vessels as well, such as ships, buses, trains, and the like.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An aircraft including a dual configuration aircraft lavatory for single person use or assisted person use comprising:
    an aircraft body containing an aircraft cabin, the aircraft cabin having a longitudinal length between a front of the cabin and a rear of the cabin, and the aircraft cabin having a lateral width between opposite first and second interior sidewalls extending upwardly and curving laterally toward each other to a roof of the aircraft cabin;
    a floor surface in the aircraft cabin; and
    a lavatory structure in the aircraft cabin, the lavatory structure being positioned in an area between the floor surface and the first interior sidewall and comprising:
        a plurality of walls enclosing and defining a lavatory interior space, wherein a first wall of the plurality of walls is coextensive with a portion of the first interior sidewall;
        a door for accessing the lavatory structure, the door being disposed on a second wall of the plurality of walls, the second wall being opposite the first wall;
        a toilet inside the lavatory interior space, the toilet positioned against the first wall;
        a washing station inside the lavatory interior space; and
        a waste receptacle movable between a first position and a second position,
            wherein the waste receptacle is in the first position when laterally adjacent to the washing station and releasably attached to an external surface of the washing station, one or more of the plurality of walls, or both, and
            wherein the waste receptacle is in the second position when it occupies a second predetermined volume of space in the aircraft cabin separated from a first predetermined volume of space occupied by the waste receptacle in the first position,
        wherein the lavatory interior space includes a first occupiable floor area when the waste receptacle is in the first position, the first occupiable floor area allowing for an adult human to stand directly in front of the toilet, washing station and waste receptacle,
        wherein when the waste receptacle is in the first position, the lavatory structure includes an unobstructed access volume defined by an unobstructed height, an unobstructed width and an unobstructed length, the unobstructed height extending between a floor within the lavatory structure and a ceiling within the lavatory structure, the unobstructed width encompassing a maximum width of the door when the door is in a closed position, and the unobstructed length extending from the door to the toilet, and
        wherein moving the waste receptacle from the first position to the second position reveals the first predetermined volume of space within the lavatory structure so that the first occupiable floor area is increased to a second occupiable floor area such that two adult humans simultaneously fit within the lavatory interior space.

2. The aircraft of claim 1, wherein an additional space created when the waste receptacle is in the second position is located in between the washing station and the second wall, and one of the two adult humans occupies the additional space when two adult humans are inside the lavatory structure.

3. The aircraft of claim 2, wherein the washing station includes a sink positioned within the lavatory interior space such that the sink is reachable by a hand of an adult human while the adult human is disposed on the toilet or while the adult human is seated in an aisle wheelchair on a floor area adjacent the toilet within the lavatory structure.

4. The aircraft of claim 3, wherein the sink has a long dimension oriented at an angle between 40 and 50 degrees relative to a rear wall of the plurality of walls that faces the rear of the cabin, the washing station positioned against the rear wall.

5. The aircraft of claim 1, wherein the plurality of walls include a first lateral sidewall extending between the first wall and the second wall and a second lateral sidewall extending between the first wall and the second wall, a maximum width of the lavatory being a distance between the first lateral sidewall and the second lateral sidewall, and the second occupiable floor area including an unobstructed subarea having a width between the first and second lateral sidewalls at their maximum distance and a length of 300 mm measured from the second wall toward the first wall.

6. The aircraft of claim 1, wherein the waste receptacle is in the second position when attached at a securement interface in a cabin galley.

7. The aircraft of claim 1, wherein the lavatory structure includes a guide structure and the waste receptacle is slidable along the guide structure so that the waste receptacle is removable from the first position.

8. The aircraft of claim 1, wherein the lavatory interior space has a first unobstructed volume when the waste receptacle is in the first position and a second unobstructed volume larger than the first unobstructed volume when the waste receptacle is in the second position, the second unobstructed volume being at least 4% greater than the first unobstructed volume and revealing a subvolume across a maximum width of the lavatory and at least 300 mm in length from the second wall toward the first wall, the width being measured orthogonally relative to a direction between the first and second walls.

9. The aircraft of claim 1, further comprising a stowage space below the lavatory interior space, the stowage space having a volume sufficient so that the waste receptacle is disposable therein and the waste receptacle being in the second position when positioned in the stowage space.

10. The aircraft of claim 9, wherein the lavatory structure further comprises a floor area that includes a stowage door providing access to the stowage space when opened, the stowage door located and openable so that the waste receptacle is slidable between the first position and the second position.

11. The aircraft of claim 1, wherein the waste receptacle is in the second position when positioned entirely above the first predetermined volume of space.

12. An aircraft including a dual configuration aircraft lavatory for single person use or assisted person use comprising:

an aircraft body containing an aircraft cabin, the aircraft cabin having a longitudinal length between a front of the cabin and a rear of the cabin, and the aircraft cabin having a lateral width between opposite first and second interior sidewalls extending upwardly and curving laterally toward each other to a roof of the aircraft cabin;

a floor surface in the aircraft cabin; and a lavatory structure in the aircraft cabin, the lavatory structure being positioned in an area between the floor surface and the first interior sidewall and comprising:

a plurality of walls including a first lateral wall, a second lateral wall, an outer wall, and an inner wall enclosing and defining a lavatory interior space, wherein the outer wall is coextensive with a portion of the first interior sidewall and the inner wall is parallel to an aisle adjacent to the lavatory structure, a door for accessing the lavatory structure, the door being disposed on the inner wall;

a toilet inside the lavatory interior space and positioned adjacent to the first lateral wall and the outer wall; and a washing station inside the lavatory interior space and positioned adjacent to the second lateral wall and the outer wall, wherein the washing station includes a sink having a long dimension non-parallel to a length of the second lateral wall so that the sink is accessible by an adult human either disposed on the toilet or an adult human disposed in an aisle wheelchair in a space adjacent to the toilet;

a waste receptacle movable between a first position and a second position, wherein the waste receptacle is laterally adjacent to the washing station and releasably attached to an external surface of the washing station and the second lateral wall in the first position, and wherein the waste receptacle is positioned external to the lavatory structure in the second position;

wherein the lavatory interior space includes a first occupiable floor area when the waste receptacle is in the first position, the first occupiable floor area allowing for an adult human to stand directly in front of the toilet, washing station and waste receptacle, the lavatory interior space including an unobstructed access volume between the door and the toilet, the unobstructed access volume defined by an unobstructed height, an unobstructed width and an unobstructed length, the unobstructed height extending between a floor within the lavatory structure and a ceiling within the lavatory structure, the unobstructed width encompassing a maximum width of the door when the door is in a closed position, and the unobstructed length extending from the door to the toilet, and wherein moving the waste receptacle from the first position to the second position reveals a second occupiable floor area within the lavatory structure between the washing station and the inner wall so that two adult humans simultaneously fit within the combined first and second occupiable floor areas of the lavatory interior space, and wherein the second occupiable floor area is between 0.1 and 0.2 cubic meters.

13. The aircraft of claim 12, wherein the long dimension of the sink is oriented at an angle between 40 and 50 degrees relative to the second lateral wall.

14. The aircraft of claim 13, wherein the sink includes a portion at a first distance from the outer wall and the toilet includes a portion at the first distance from the outer wall.

15. The aircraft of claim 12, wherein the waste receptacle is adapted to support a load of up to 12 kilograms disposed therein.

16. The aircraft of claim 12, wherein the lavatory structure is sized to fit between an aisle and the first interior sidewall when the aircraft is configured so that the aisle is the only aisle along a length of the cabin.

17. The aircraft of claim 12, wherein when the waste receptacle is in the second position, space within the lavatory structure is sufficient so that one adult human seated in an aisle wheelchair and another adult human in a standing position simultaneously fit within the lavatory interior space.

18. A dual configuration aircraft lavatory for single person use or assisted person use comprising:
a plurality of walls including a first wall that is coextensive with a portion of an aircraft cabin sidewall, the plurality of walls enclosing a first subarea, a second subarea, a third subarea and a fourth subarea combined to define a cross-sectional area enclosed by the plurality of walls, each of the first, second, third and fourth subareas being nonoverlapping;
a door disposed on a second wall of the plurality of walls, the second wall being opposite the first wall;
a washing station inside the lavatory and corresponding to the first subarea;
a toilet inside the lavatory and corresponding to the second subarea;
a floor area directly below an unobstructed space sufficient for substantial occupation by an adult human, the floor area corresponding to the third subarea, the washing station and the toilet being accessible by the adult human when the adult human occupies the floor area, wherein the unobstructed space extends from a surface of the floor area to a ceiling of the lavatory along an entire distance between the toilet and the door, the unobstructed space having a width at least equal to a maximum width of a frame of the door on the second wall; and
a waste receptacle movable between a first position and a second position,
wherein the waste receptacle is in the first position when laterally adjacent to the washing station and releasably attached to an external surface of the washing station, one or more of the plurality of walls, or both, the waste receptacle inside the lavatory and corresponding to the fourth subarea when in the first position,
wherein when the waste receptacle is in the first position, the waste receptacle is outside of the unobstructed space, and
wherein the waste receptacle is in the second position when the third and fourth subareas are both free of obstructions so that two adult humans can substantially occupy a combined space above the third and fourth subareas.

19. The dual configuration aircraft lavatory of claim 18, wherein the fourth subarea is at least 0.12 square meters.

20. The dual configuration aircraft lavatory of claim 18, wherein the third and fourth subareas have a combined area at least 16% greater than the third subarea alone.

* * * * *